United States Patent
Korenevsky et al.

(10) Patent No.: US 7,249,140 B1
(45) Date of Patent: Jul. 24, 2007

(54) RESTARTABLE SCALABLE DATABASE SYSTEM UPDATES WITH USER DEFINED RULES

(75) Inventors: Greg Korenevsky, Manhattan Beach, CA (US); Alex Yung, Walnut, CA (US); Steven Feinholz, Valencia, CA (US)

(73) Assignee: NCR Corp., Dayton, OH (US)

( * ) Notice: Subject to any disclaimer, the term of this patent is extended or adjusted under 35 U.S.C. 154(b) by 796 days.

(21) Appl. No.: 10/160,754

(22) Filed: May 31, 2002

(51) Int. Cl.
*G06F 17/30* (2006.01)
*G06F 15/16* (2006.01)

(52) U.S. Cl. .......................... 707/102; 707/2; 719/313
(58) Field of Classification Search ................. 706/45, 706/60; 707/2; 719/313
See application file for complete search history.

(56) References Cited

U.S. PATENT DOCUMENTS

| | | | | |
|---|---|---|---|---|
| 4,970,658 A | * | 11/1990 | Durbin et al. | ................. 706/60 |
| 5,701,400 A | * | 12/1997 | Amado | ........................ 706/45 |
| 6,560,592 B1 | * | 5/2003 | Reid et al. | ..................... 707/2 |
| 6,571,282 B1 | * | 5/2003 | Bowman-Amuah | ......... 709/219 |
| 6,732,361 B1 | * | 5/2004 | Andreoli et al. | ............ 719/313 |
| 6,810,405 B1 | * | 10/2004 | LaRue et al. | ............... 707/201 |

* cited by examiner

*Primary Examiner*—Jeffrey Gaffin
*Assistant Examiner*—Hassan "Tony" Mahmoudi
(74) *Attorney, Agent, or Firm*—Baker Botts; Charles Q. Maney

(57) ABSTRACT

A method, computer program, and computer system for updating a database system using a parallel application are disclosed. The parallel application includes a plurality of parallel operators. The method includes receiving records. A unique identifier is assigned to each record. A user defined rule condition is evaluated for each record. An action identifier is assigned to a subset of the records, based on the evaluation of the user defined rule condition. The records are transmitted to the database system with the unique identifiers and, for each of the subset of records, action identifiers.

22 Claims, 7 Drawing Sheets

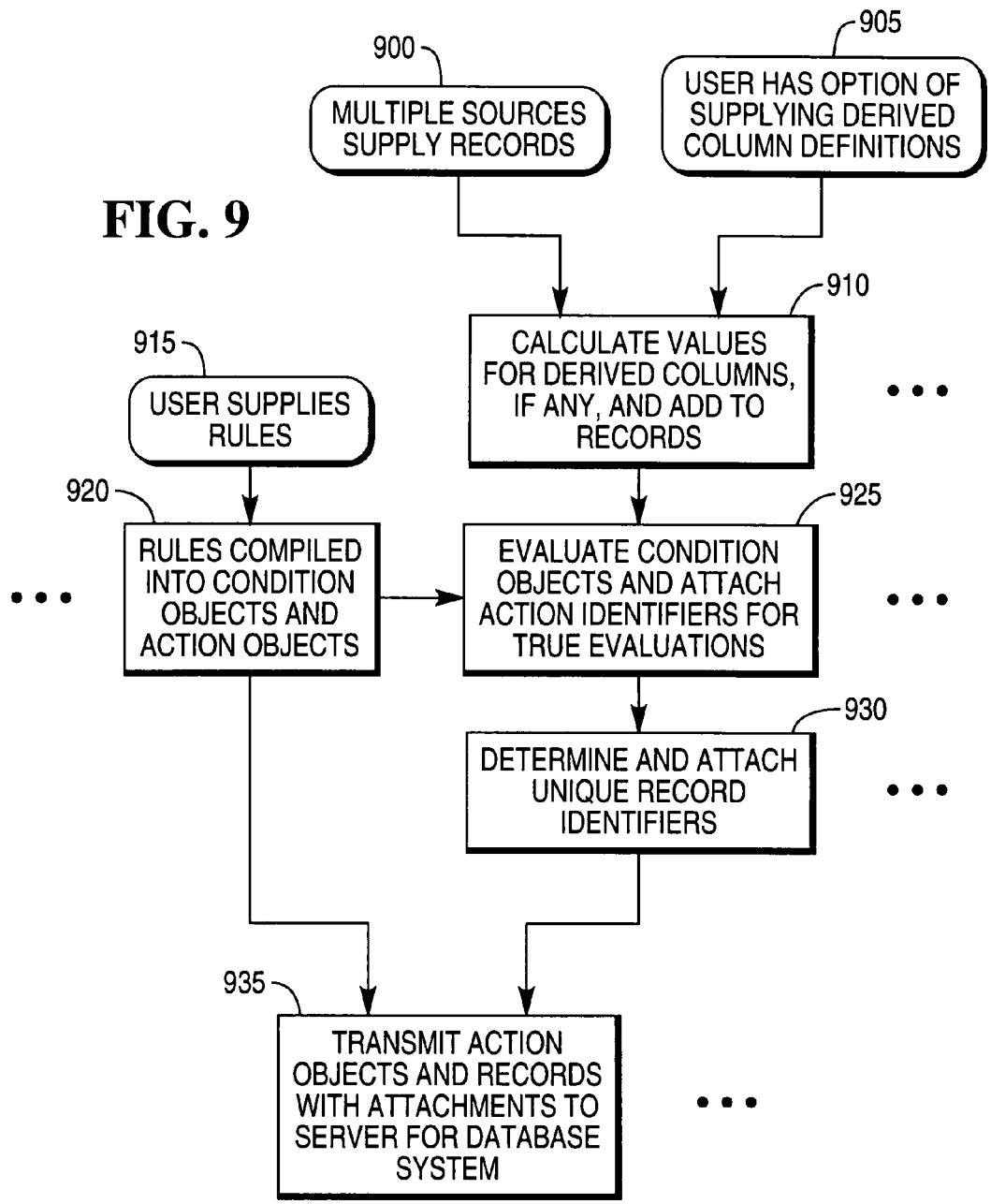

RESTARTABLE SCALABLE DATABASE SYSTEM UPDATES WITH USER DEFINED RULES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Relational Database Management Systems (RDBMS) have become an integral part of enterprise information processing infrastructures throughout the world. An RDBMS 100, as shown in FIG. 1, maintains relational data structures called "relational tables," or simply "tables" 105. Tables 105 consist of related data values known as "columns" (or "attributes") which form "rows" (or "tuples").

An RDBMS "server" 110 is a hardware and/or software entity responsible for supporting the relational paradigm. As its name implies, the RDBMS server provides services to other programs, i.e., it stores, retrieves, organizes and manages data. A software program that uses the services provided by the RDBMS Server is known as a "client" 115.

In many cases, an enterprise will store data in an operational data store (ODS) 200, illustrated in FIG. 2, which is designed to efficiently handle a large number of small transactions, such as sales transactions, in a short amount of time. If the enterprises wishes to perform analysis of the data stored in the ODS, it may move the data to a data warehouse 205, which is designed to handle a relatively small number of very large transactions that require reasonable, but not necessarily instantaneous response times.

To accomplish this, data is "imported," or "loaded" (block 210) from various external sources, such as the ODS 200, into the data warehouse 205. Once the data is inside the data warehouse 205, it can be manipulated and queried. Similarly, the data is sometimes "unloaded" or "exported" from the data warehouse 205 into the ODS 200 or into another data store. Since both load and unload processes share many similarities, in terms of the processing they perform, they will be referred to hereinafter as "database loads" or "loads."

A database load is typically performed by a special purpose program called a "utility." In most cases the time required to perform a database load is directly proportional to the amount of data being transferred. Consequently, loading or unloading "Very Large Databases" (i.e. databases containing many gigabytes of data) creates an additional problem—increased risk of failure. The longer a given load runs, the higher the probability is that it will be unexpectedly interrupted by a sudden hardware or software failure on either the client 115 or the server 110. If such a failure occurs, some or all of the data being loaded or unloaded may be lost or unsuitable for use and it may be necessary to restart the load or unload process.

"Parallel Processing," a computing technique in which computations are performed simultaneously by multiple computing resources, can reduce the amount of time necessary to perform a load by distributing the processing associated with the load across a number of processors. Reducing the load time reduces the probability of failure. Even using parallel processing, however, the amount of data is still very large and errors are still possible.

BRIEF SUMMARY OF THE INVENTION

In general, in one aspect, the invention features a method for updating a database system using a parallel application. The parallel application includes a plurality of parallel operators. The method includes receiving records. A unique identifier is assigned to each record. A user defined rule condition is evaluated for each record. An action identifier is assigned to a subset of the records, based on the evaluation of the user defined rule condition. The records are transmitted to the database system with the unique identifiers and, for each of the subset of records, action identifiers.

Implementations of the invention may include one or more of the following. For each record, a unique update identifier based on the record, its unique identifier, and its action identifiers is transferred to the database system. In another implementation one or more user defined rules is received and an action and a user defined rule condition are each generated for each of the user defined rules. An action identifier is assigned to each action/user defined rule condition pair and the one or more actions are transmitted to the database system.

In general, in another aspect, the invention features a computer program for updating a database system using a parallel application. The parallel application includes a plurality of parallel operators. The program includes executable instructions for programming a computer to do the following. The computer receives records. A unique identifier is assigned to each record. A user defined rule condition is evaluated for each record. An action identifier is assigned to a subset of the records, based on the evaluation of the user defined rule condition. The records are transmitted to the database system with the unique identifiers and, for each of the subset of records, action identifiers.

In general, in another aspect, the invention features a computer system, for updating a database system using a parallel application. The parallel application includes a plurality of parallel operators. The computer system includes one or more nodes. Each of the one or more nodes provides access to one or more CPUs. Each of the one or more CPUs provides access to one or more operators. One of the operators is a source record identifier generator. One of the operators is a rule evaluator operator coupled to receive records and unique identifiers from the source record identifier generator. One of the operators is an update operator coupled to receive records, unique identifiers, and action identifiers from the rule evaluator operator. A database system server is coupled to receive records, actions, and an update identifier from the update operator.

BRIEF DESCRIPTION OF THE SEVERAL VIEWS OF THE DRAWING(S)

FIG. 9 is a flow chart of a parallel application process for updating a database system.

DETAILED DESCRIPTION OF THE INVENTION

Figure 1:
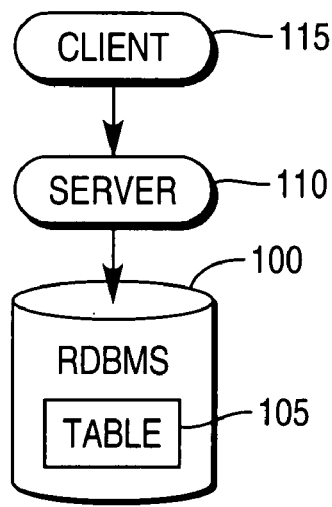
FIG. 1 is a block diagram of a prior art system incorporating an RDBMS.

The following definitions, abbreviations, and phrases, which are used in this application, are not intended to limit the scope of the invention in any way. They are provided for the benefit and convenience of the reader:

1. "Relational tables," or simply "tables," are conceptual relational data structures maintained by the RDBMS.

2. Tables consist of related data values known as "columns" (or "attributes") which form "rows" (or "tuples").

3. An RDBMS Server is a hardware and/or software entity responsible for supporting the relational paradigm. As its name implies, the RDBMS server provides miscellaneous services that enable storage, retrieval, organization and management of data.

4. A software and/or hardware entity that utilizes the services provided by the RDBMS server is known as a client.

A database load process usually:

1. Introduces data into newly created tables. The tables are initially created empty and require an outside process to populate them with data. This type of load is commonly known as an "initial load."

2. Introduces new data into previously created (existing) tables. This type of load is sometimes referred to as an "append."

3. Modifies data in existing tables through one of the following operations:
   INSERT—add new rows to the tables
   UPDATE—modify current column values
   DELETE—delete existing table rows This type of load is sometimes called an "update."

A "database export" process usually extracts data from existing tables and copies it to an external data store.

| | |
|---|---|
| DBMS | Database Management Systems |
| RDBMS | Relational Database Management Systems |
| Parallel Computer | A set of processors which can work cooperatively to solve a computational problem |
| Parallel Program | A program designed to take advantage of the parallel processing capability of the underlying hardware |
| Data Partitioning | Division of a data source into multiple disjoint partitions |
| Functional Partitioning | Division of a process into multiple processes along functional boundaries |
| Functional Parallelism | see Functional Partitioning |
| Pipelining | see Functional Partitioning |
| Scalability | The ability of a program to take advantage of additional computing resources, such as I/O devices, CPUs, memory, network connections, etc., to accommodate an increase in computational load |
| Database Load | The process of transferring data from an external source into a DBMS |
| Database Unload | The process of transferring data from a DBMS to an external target. The opposite of Database Load |
| State | A representation of a program's execution at a given point in time. |
| State Transition | A process whereby the program enters a new state |
| Checkpoint | Program's state information recorded externally |
| Checkpointing | A technique designed to reduce risk due to failure |
| Restart | A process whereby a previously terminated program resumes its processing. |
| Collective State | A combined state of a parallel program |
| PEI | Parallel Execution Infrastructure |
| ADSF | Asynchronous Data Stream Facility |
| Virtual Table | A named table that does not physically exist, but exists only at runtime when PEI processes the operations associated with its definitions |
| CRCF | Checkpoint and Restart Coordination Facility |
| MPP | Massively Parallel Processors |
| Parallel Instance | A copy of a program running as a separate process |
| I/O | Input/Output |
| OLTP | On-Line Transaction Processing |
| Distributed Process | A logical process carried out by several distinct processes |
| DSM | Distributed State Machine |
| Dialog | A multiple data interchange between programs within a given context |
| API | Application Programming Interface |

One issue related to a database system update using a parallel application is resuming the update after a failure. A failure can occur as a result from many different problems including software and hardware difficulties. When different processes are sharing the burden of performing an update dynamically, a record that is processed by one operator may be processed by another parallel operator after a restart. Restarts can occur from a mid-point in the performance of an update for which there is sufficient information, called a checkpoint.

Checkpointing is a technique that enables programs to recover from unexpected failures, such as unexpected power loss, severe hardware malfunctions, etc., not easily handled by other means. Without checkpointing, such failures may require a failed program to be re-executed from the very beginning. For long-running tasks, such as many loads and unloads, this may result in hours of lost computing time and missed deadlines. Checkpointing makes it possible to control this situation.

Checkpointing is based on a notion of a program's "state," which, in one example, can be defined as a combination of some or all of the following:

The current instruction being executed

The next instruction to be executed

All internal and external variables

The call stack

Dynamic storage allocated by the program

External queues, e.g., I/O request queues

The states of external inputs and outputs

The states of other external resources, e.g., communication links, semaphores, etc.

During execution a program transitions from one state to another. Checkpointing records a program's current state to an external persistent storage location, such as a file. To simplify this task, checkpointing is preferably performed when a minimum amount of information is required to describe the program's state. The program records its state information, verifies that the store occurred, and then proceeds with the rest of its processing.

State information recorded in this manner is known as a "checkpoint." Checkpoints can be taken at regular time intervals, which are called "checkpointing intervals." When an unexpected failure occurs, processing can be resumed, or "re-started," from the most recent checkpoint that occurred before the failure. During re-start, the program reads the most recent valid checkpoint, sets its state according to the information it contains, and proceeds with the rest of the processing. In effect, the processing continues as if it were never interrupted.

Checkpointing makes it possible to control the maximum amount of time necessary to re-run a failed program, since that time would not exceed the size of the most recent checkpointing interval. The downside of checkpointing is that it imposes a certain amount of processing overhead, thereby slowing down program execution. However, since the overhead is proportional to the checkpointing frequency, the user can choose the checkpointing interval that best balances those considerations.

An Application Programming Interface, or API, provides the interface to the parallel operators of the parallel application. The API also defines a protocol that dictates the sequence and the timing of requests and responses between those operators. The parallel programs are designed to operate and communicate in accordance with this protocol.

The Parallel Execution Infrastructure is initialized before it runs any parallel utilities. It can be started independently on a single multi-processing node, or span several processing nodes, including massively parallel processors ("MPP") and network-connected processors ("network clusters"), using the nomenclature associated with the Teradata Active Data Warehousing System available from NCR Corporation.

Parallel utility program execution is initiated by submitting a request to the PEI to create a "Parallel Application," which represents a particular execution of a parallel program. Multiple distinct executions of a given parallel program correspond to multiple distinct Parallel Applications within PEI. After a Parallel Application is created, it can be referred to by name in subsequent requests to the PEI.

Parallel database utility programs execute as parallel applications within the PEI. The PEI provides low-level, system-oriented services, while the utilities implement higher-level, database-oriented functions.

Operators

Internally, the utilities are structured as a set of "operators" that can create, modify and consume "virtual table" rows. Each operator is designed to perform a specific function, e.g. retrieve rows of data from external files, store rows of data in database tables, evaluate logical expressions involving column values, etc. "Virtual tables" represent an operator's inputs and outputs.

Operators are divided into four general categories based on the function they perform:

Producers—create "virtual table" rows by, e.g., reading external data sources, such as files Consumers—read the "virtual table" rows and store them in external data sinks, e.g., DBMS tables Filters—read "virtual table" rows and use them to produce other "virtual table" rows Standalone—neither create nor read "virtual table" rows Since producers, consumers and filters can either create or read virtual tables, they can be combined by inter-connection of their inputs and outputs in the following ways:

Producer→Consumer

Producer→Filter→Consumer

Producer→Filter→Filter→ . . . →Filter→Consumer

Data Streams

Asynchronous Data Streams can be used as one way to interconnect the operators. They enable the flow of data between the operators. A data stream has an origin and a destination. In order for the data to flow through the data stream, it has to be opened both at the origin and at the destination. Once the data stream is open, the origin and the destination programs can issue read and write requests to initiate the transfer of data. In one example, the read and write operations can be issued in any order, i.e. in a non-synchronized manner, or "asynchronously." For this reason, these data streams are referred to as "asynchronous." The data streams provide the buffering mechanism that enables each operator to execute independently of and in parallel with the other operators that either consume or provide its data. Further, since operators interchange data only through the data streams, they are not concerned with the specifics of the interconnection, and can be arranged in many different sequences to accomplish a wide variety of tasks.

Another benefit of using asynchronous data streams is that they obviate the need for intermediate data stores, which typically results in faster execution times and helps avoid various system limitations, such as limitations on maximum file size. For example, a utility operator can export data from an OLTP DBMS server, send it via the data stream to a filtering and conditioning operator, which, in turn, can send it to a data warehouse loading operator. The entire process can be performed in a single step without storing intermediate results on external media, resulting in faster execution time.

In addition to transferring data between the operators, the data streams make it possible to inter-connect multiple operators, to merge their outputs into a single data stream or to split it into multiple data streams. The actual mechanism underlying the data streams varies from one architecture to another and includes various memory-based and communication protocol-based implementations.

From time to time the operators may need to coordinate their processing, e.g. during checkpoint processing. A Checkpoint-Restart Coordination Facility ("CRCF") can be provided to enable this coordination. The CRCF controls the operations of "executors," which are special components designed to control operator execution.

The CRCF includes a central coordinator, which supervises a given coordination activity, such as the processing of a checkpoint. The coordinator maintains two-way communications with executors, which, in turn, relay requests to the operators. The sequence and the timing of the requests are dictated by the coordination protocol, which is implemented by all the components: the CRCF, the executors, the operators and the asynchronous data streams. The flow of coordination requests and responses forms a "control data stream."

Figure 3:
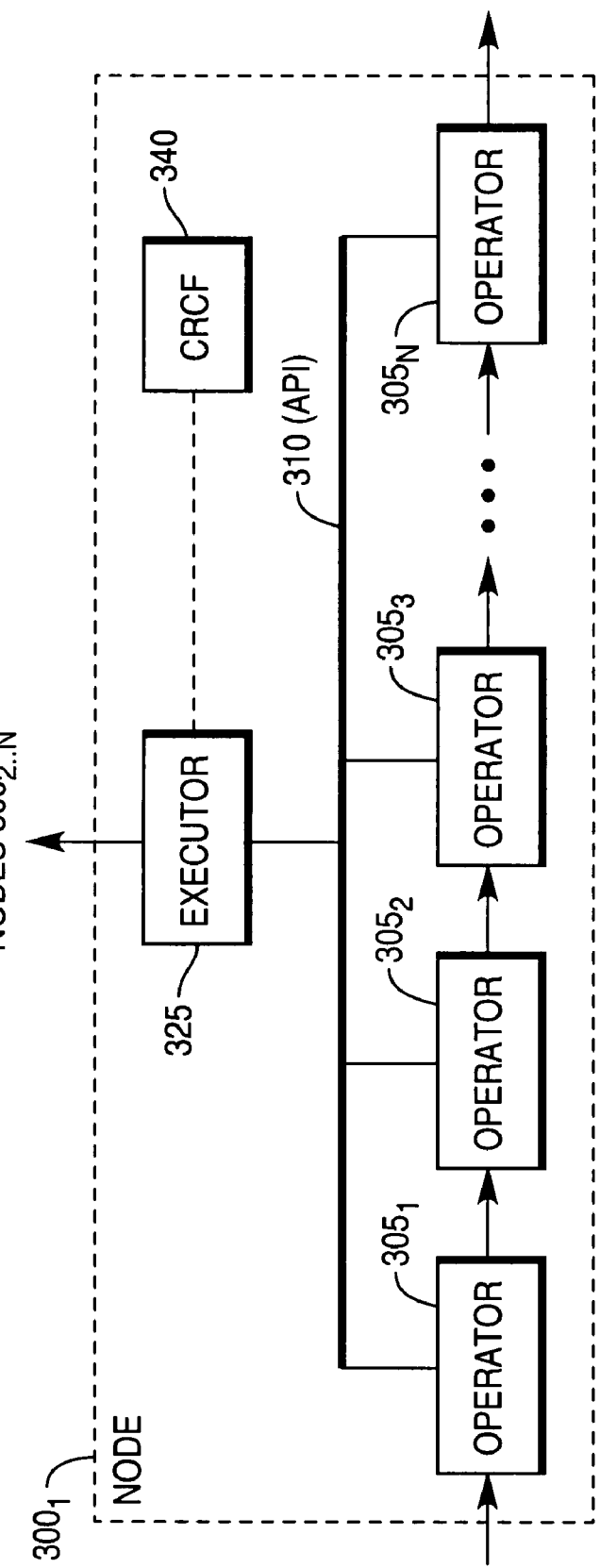
FIG. 3 is a block diagram of a parallel processing system.

An example architecture for a system as described above with very large databases using a parallel database system, such as a Teradata Active Data Warehousing System available from NCR Corporation, is illustrated in FIG. 3. FIG. 3 shows a sample architecture for one node 300, of the DBS. The architecture can be extended with additional nodes, $300_2 \ldots _N$. The DBS node 300, includes one or more executors 325, each of which manages one or more operators $305_1 \ldots _N$ through API 310. Operators $305_1 \ldots _N$, each of which could run under an Executor, may execute on one or more physical processors, with one or more virtual processors running on one or more physical processors.

For the case in which one or more Executors are running on a single physical processor, the single physical processor swaps between the set of N Executors.

Each of the operators $305_1 \ldots _N$ has a certain purpose and carries out a particular function necessary within the overall database loading or unloading task. A load task may include multiple operators, each one capable of executing independently and in parallel with other operators. An asynchronous data stream facility that inter-connects the operators, shown on the diagram as arrows between the operators, enables parallelism for operators that share data. As a result of this arrangement, many operations within the load or unload task can be performed simultaneously and in parallel, resulting in reduction of the overall execution time.

Figure 4:
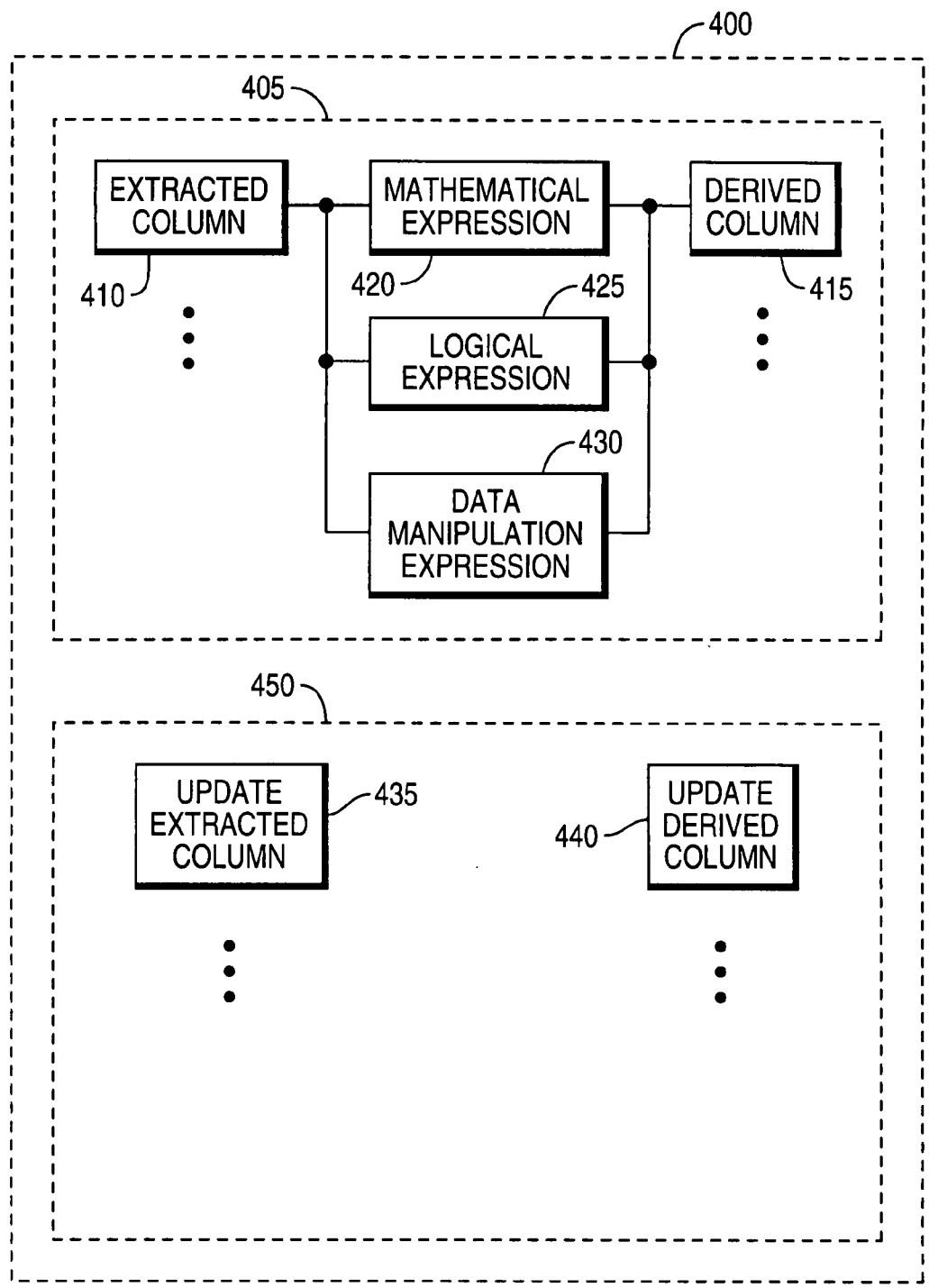
FIG. 4 is a data structure diagram of a user defined rule.

A user of an update facility implemented using a parallel operator structure controls the manner of the update by submitting user defined rules. An example structure of a user defined rule 400 is depicted in FIG. 4. The rule 400 includes a condition portion 405 and an action portion 450. Similar to an IF . . . THEN statement, the action portion 450 is implemented only for those records that satisfy the condition portion 405. An unconditional rule has a condition portion 405 of TRUE, so that it is satisfied for every possible record. This results in the action portion 450 being applied to all records. Rules that have explicit conditions are called 'conditional rules'. Every new input record (or row) causes a new evaluation of the rules' conditions. Every condition that evaluates to TRUE triggers execution of the rule's action part.

A user may include multiple conditional and unconditional update rules. For conditional rules the logical conditions may be either mutually exclusive, or mutually inclusive. Mutually exclusive conditions may trigger only one action, which could contain one or more database operations (e.g. DML statements). Mutually inclusive conditions may trigger multiple actions depending on how many of them evaluate to TRUE. Finally, it is possible that none of the conditions evaluate to TRUE; in this case no actions are triggered. As an example, mutually exclusive rules can combine a first action with a condition that a date column of the record be before the year 2000, while combining a second action with a condition that the date column of the record be during or after the year 2000. Mutually inclusive rules could combine a first action with a condition that a date column of the record be before the year 2000, while combining a second action with a condition that the date column of the record be after the year 1998. In that situation, both actions would be applied to records with a date in 1999.

Figure 7:
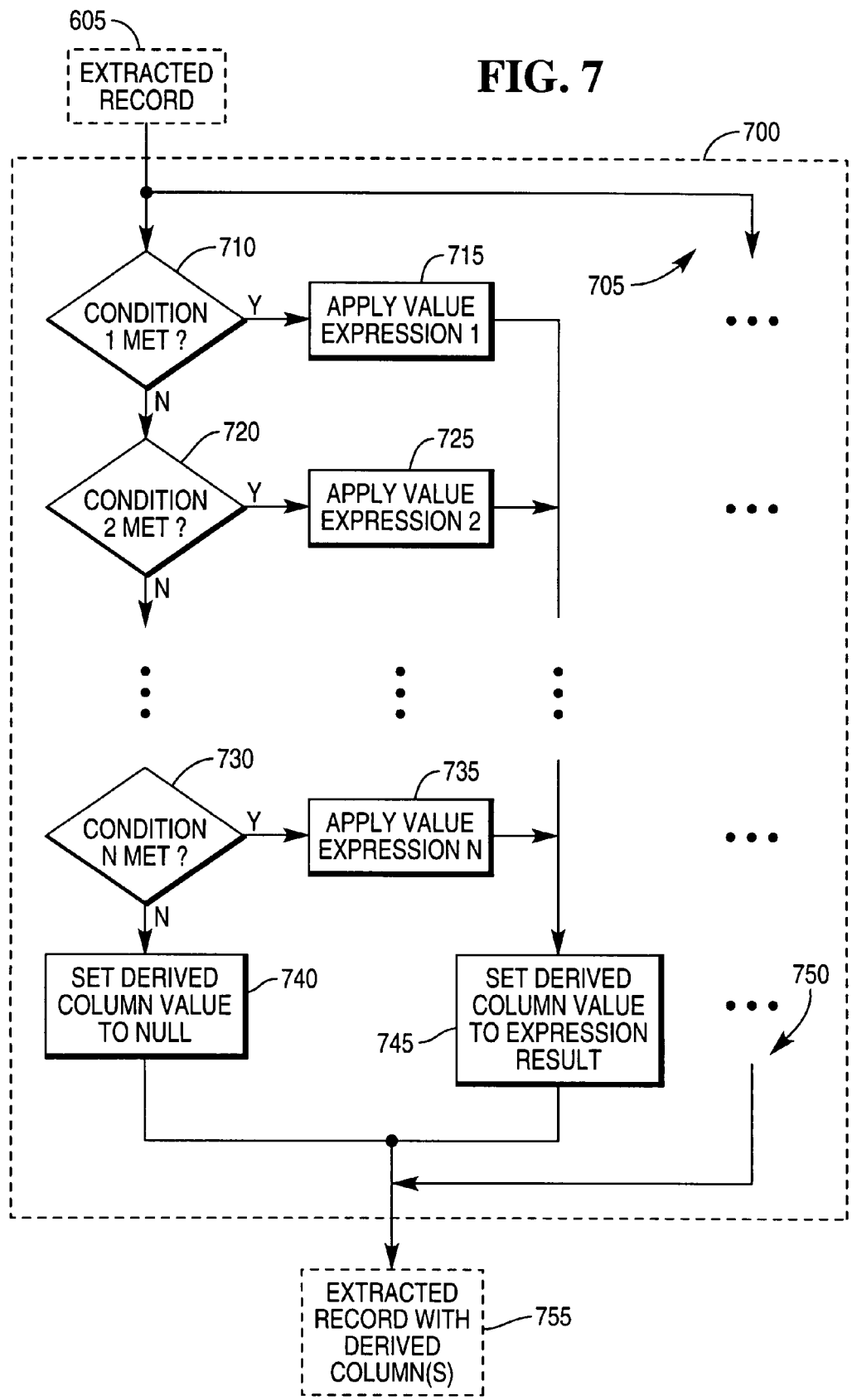
FIG. 7 is a block diagram of a derived column projector operator.

The condition portion 405, can include references to extracted columns 410 and derived columns 415. As indicated, more than one of each type of column can be referenced. Extracted columns 410 are the columns present in the record as it is provided by a source. Derived columns 415 are generated for each record during the update process. FIG. 7 describes the operator that generates derived columns 415 in more detail. The column values can be referenced in expressions including but not limited to mathematical expressions 420, logical expressions 425, and data manipulation expressions 430. For example, a mathematical expression could compare an extracted column having numerical values to a specified number and evaluate as true when the column is greater. The condition portion 405 can also combine different types of expressions. For example, two mathematical expressions 420 could be connected with a logical expression. An example for records having a price column and a date column would be: price−price*0.1>$1000 AND (date=2000 OR date=1995). All records with dates in 1995 and 2000 would return a TRUE evaluation if the price for the record is more than $1000.

The action portion 450 of the user defined rule 400 contains the action applied to records that meet the condition portion 405. In one implementation, the action portion 450 includes an update statement expressed through the SQL DML. Just like the condition portions 405, these DML can internally reference both extracted columns 435 and derived columns 440.

Figure 5:
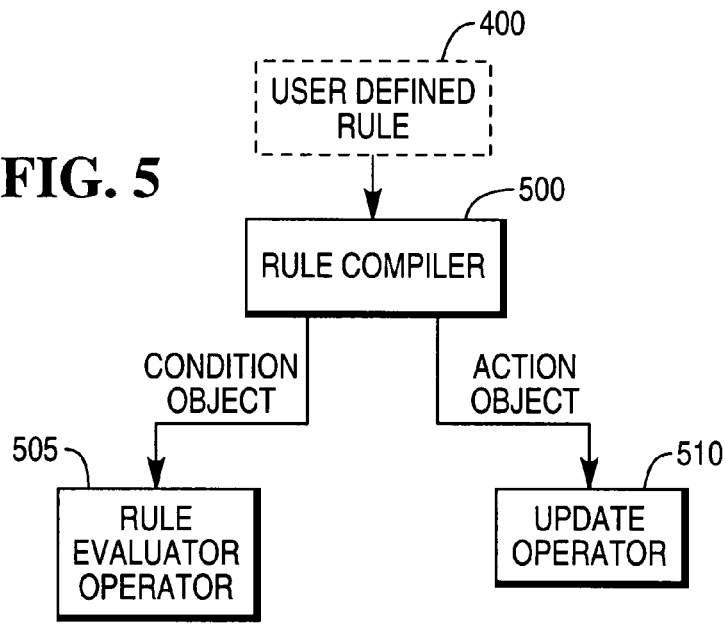
FIG. 5 is a block diagram of a rule compiler.
Figure 6:
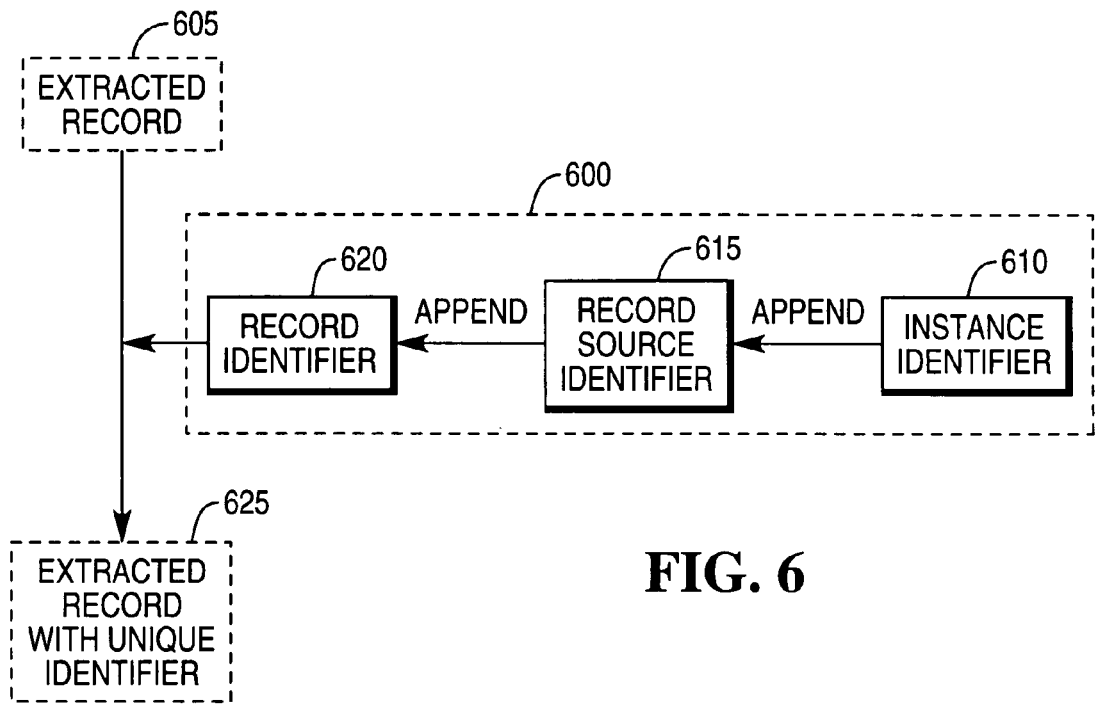
FIG. 6 is a block diagram of a source record identifier generator.

FIG. 5 depicts a block diagram of the rule compiler 500. The rule compiler 500 receives each user defined rule 400. The rule compiler 500 analyzes each rule 400 and then decomposes each rule 400 into two objects: the condition object representing the condition portion 405, and the action object representing the action portion 450. Both the condition and the action objects generated from a rule 400 are assigned the same identifier different from identifiers assigned to the objects generated from other rules, called an update rule identifier or action identifier. In one implementation, the action identifiers are later used to match up the conditions with their corresponding actions. The condition objects are passed to the rule evaluator operator 505, which handles the actual evaluation of the conditions for each input record. The rule evaluator operator 505 is discussed in more detail in connection with FIG. 8. The action objects are passed to the update operator 510, which handles the actual application of the actions or transmits them to the server of the database system where they will be applied FIG. 6 depicts a block diagram of a source record identifier generator 600. For each extracted record 605, the source record identifier generator 600 assigns a unique identifier resulting in the record with the attached identifier 625. Thus, the source record identifier generator 600 uniquely identifies every record (row) obtained from multiple input sources. Because input sources can be processed simultaneously (in parallel) during the update process, in order to restart after an error it is important in some implementations to uniquely identify every record that is transmitted to the server of the database system. To enable restartability, this source record identifier generator 600 implements a consistent identification process that yields the same sequence of identifier values across multiple restarts for each input source and each record extracted from that source. During restart some of the records may be re-processed and retransmitted to the server. Because their identifier values in that case are the same, however, the server can safely discard copies, leaving only one record with a given identifier value.

One implementation of the unique identifier generation is shown with the identifier having three separate components: an instance identifier 610 appended to a record source identifier 615 appended to a record identifier 620. The instance identifier 610 is used to distinguish the identifier generated by source record identifier generators 600 acting in parallel. Such parallel processes can be referred to as instances. The record source identifier 615 distinguishes between records that are extracted from different sources. In one implementation, each source is a file in computer storage. The record identifier 620 distinguishes the records extracted from a particular source. In one implementation, the record identifiers for a source are sequentially assigned so that the first record extracted has a record identifier of 1. Other implementations that generate a unique identifier for each record being processed during the update can also be used.

FIG. 7 depicts a block diagram of a derived column projector operator 700, called DCPO herein. Derived columns are data elements that are not present in the original source, but are calculated dynamically. The DCPO 700 is a filter operator in that it both receives and transmits a stream of data. The received data comprises extracted records 605. The DCPO 700 generates the values for derived columns, as defined by the user, and appends those derived columns to the record. The user definition is checked for a first condition 710. The definition of a defined column can be unconditional, in which case the value expression 715 is simply applied. If there is a first condition 710 and it is met, the first value expression 715 is applied and none of the other conditions are evaluated. The value expression may include extracted column references, literals, and arithmetic as well as other operations. If the first condition 710 is not met, the second condition 720 and subsequent conditions are evaluated through the last on N conditions 730 until one of the conditions is met or evaluates to TRUE. The first condition that evaluates to TRUE determines the derived column value through the associated value expression and that value is appended in the derived column as named by the user 745. In one implementation, if none of the conditions evaluated to TRUE, a NULL value is appended to 740.

The DCPO 700 is not limited to a single derived column. As indicated any number of cascaded calculations 705, 750 can be performed to determine values for additional derived columns. In one implementation, the conditions, value expressions, and labels for the derived columns are all provided by the user. In another implementation, certain defaults may be provided so that user input is only necessary to change the default settings of the DCPO 700.

Figure 8:
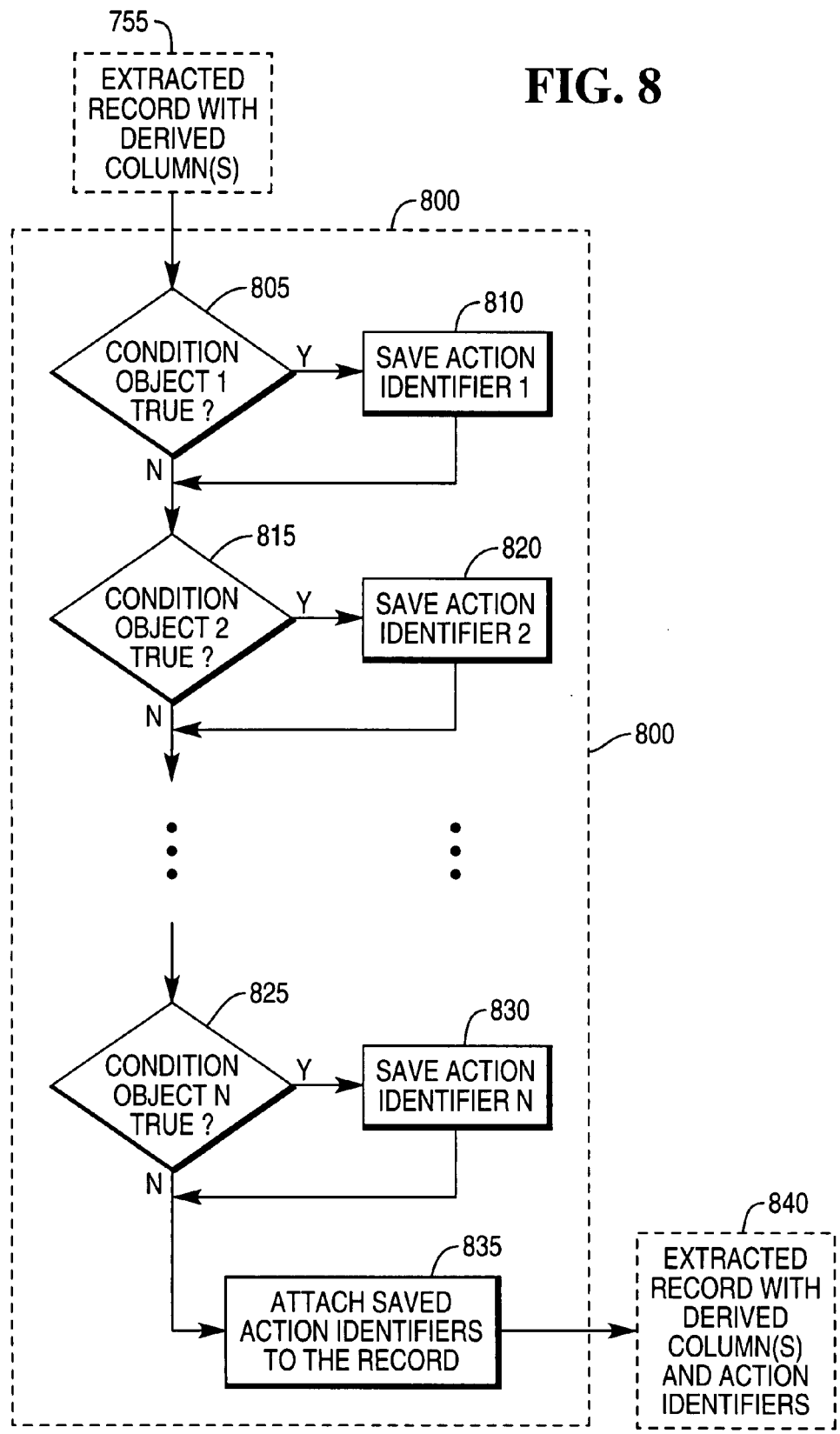
FIG. 8 is a block diagram of a rule evaluator operator.

FIG. 8 depicts a block diagram of a rule evaluator operator 800, referred to as REO herein. The REO 800 is a filter operator in that it both receives and transmits a stream of data. The received data comprises extracted records with derived columns 755. In one implementation, the REO 800 uses the API 310 to obtain the necessary column values for the record from the DCPO 700. The REO 800 determines which action objects from among those produced by compiling the user defined rules should be applied to each record. The record is then transmitted with action identifiers that correspond to the action objects. The REO identifies the action identifiers to be appended by sequentially evaluating the condition objects. In another implementation, the condition objects are evaluated in parallel. If the first condition object evaluates as TRUE for a record 805, the action identifier, also referred to as an update rule identifier, corresponding to that condition object is saved 810. The evaluations continue for the second condition 815 and subsequent conditions through the last of N conditions 825. In one implementation, unconditional rules have a condition of TRUE, such that the action identifier is saved. In another implementation, unconditional rules do not result in a condition object and the actions are applied automatically. Once all of the conditions have been evaluated, either sequentially or in parallel, the save action identifiers are attached to the record 835. The resulting record includes both any derived columns identified by the user and any action identifiers 840. The record 840 is then passed along to other operators through the Parallel Execution Infrastructure. In one implementation, records that do not have any action identifiers are dropped from the update and are not transmitted to the server of the database system.

FIG. 9 depicts a flow chart of a parallel application process for updating a database system, including the processes of an update operator for transmitting records to the server of the database system. In one implementation, three categories of information are accessed: the user supplied rules for applying actions to the records 915, the records themselves from one or more sources 900, and definitions for derived columns to be added to the records, if any 905. The records and derived column definitions are used by the DCPO 700 to calculate values for derived columns, if any, that are then added to the records 910. As indicated in the figure, multiple parallel applications can perform this step simultaneously. The user supplied rules 915 are received by the rule compiler 500, which compiles them into condition objects and action objects 920. As indicated in the figure, multiple parallel applications can perform this step simultaneously. The records with derived columns and the condition objects are received by the REO 800. The REO 800 evaluates the condition objects and attaches action identifiers to each record corresponding to true evaluations of condition objects for that record 925. As indicated in the figure, multiple parallel applications can perform this step simultaneously. For each record a unique record identifier is determined and appended 930. As indicated in the figure, multiple parallel applications can perform this step simultaneously. While the unique identifier generation is shown to occur after the other steps, in another implementation, unique identifiers are determined and attached to each record before derived column values are calculated or conditions objects evaluated for that record.

Figure 2:
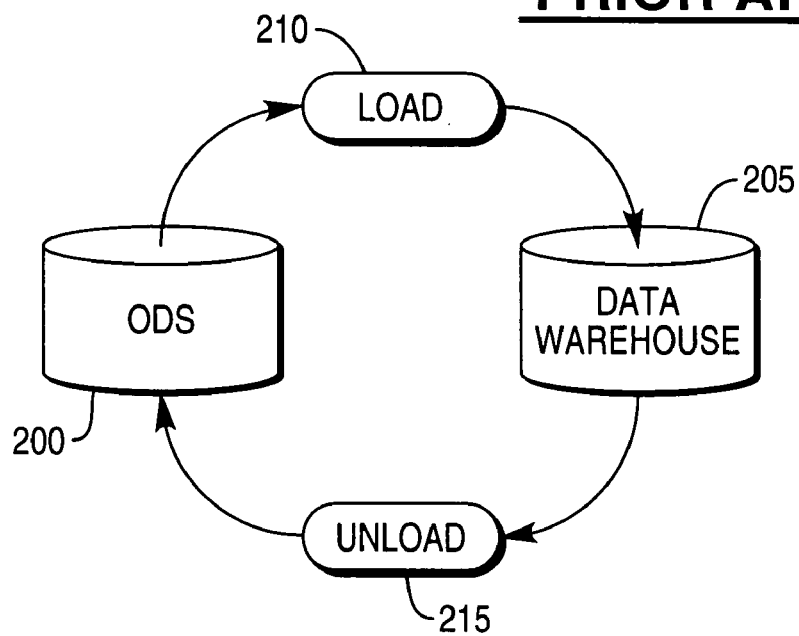
FIG. 2 is a flow chart of prior art data base load and unload processes.

The final step of transmitting action objects and records with attachments to an application or a plurality of parallel applications hosted by a server for the database system 935 is performed by the update operator 510. The update operator 510 is a consumer operator in that it receives data and then exports it outside of the Parallel Execution Infrastructure. The update operator 510 transmits actions, which can be SQL updates in one implementation as discussed with respect to FIG. 2, as well as records, including any derived columns, to the server. In one implementation, the server is a Teradata server.

The update operator 510 utilizes server-side components and communicates with them by driving multiple protocol sessions. In effect, to the database system server the update operator 510 appears as a client-side component. It can have multiple instances running as separate parallel processes, which, in turn, enables scalability, however, because it is also an operator running under the Parallel Execution Infrastructure. All the instances belonging to the same operator execute in a coordinated manner and are treated as part of the same operation by the server-side components. This enables them to share the same server-side resources and avoid table locks—factors that otherwise preclude multiple processes from performing concurrent updates to the same set of target tables in a database system.

In one implementation the update operator 510 receives the action objects, which had been created by the rule compiler 500 at initialization. If the action objects are defined by SQL DML (data manipulation language), the update operator 510 extracts the update DML from these objects and sends them to the server-side components.

The update operator 510 also receives records, also referred to as rows, through the Parallel Execution Infrastructure. Those rows have already been processed by the source record identifier generator 600, the REO 800, and, if derived columns are defined, the DCPO 700. As a result each record had been given a unique identifier and one or more action identifiers for each action that needs to be applied based on the conditions of its rule. The update operator 510 uses the above information as well as the record's data to generate a set of unique update identifiers, also referred to as match tags. Each update identifier uniquely identifies the application of a given update rule to a given input record or row. These update identifiers are combined with the data from the original record to form a new set of unique records that are subsequently sent to the server-side component over one of the sessions.

During a restart, checkpoints are initiated by the Parallel Execution Infrastructure and the update operator 510 utilizes the communication protocol (in one implementation the Teradata Multiload communication protocol) to request a checkpoint from the server-side components over each active session. Each update operator 510 instance handles its own checkpoint processing and coordinates it with other instances by using the API. Once the restart checkpoint is successfully stored, the update operator 510 resumes normal processing.

During a restart the update operator 510 communicates with the server-side components and requests a restart from the most recent checkpoint. This process is also coordinated between the multiple operator instances. Once the restart is complete, processing resumes from the most recent checkpoint and each operator instance proceeds to read and process records.

Depending on when the failure had occurred in relation to the checkpoint, a restart may cause some of the records to be re-processed. Because in some implementations the order in which records are distributed among the operator instances is not defined (i.e. these records are distributed in no specific order to allow for better workload balancing), it is not possible to predict whether the same instance will re-process the same set of records. Records that had already been processed are not eliminated strictly on the basis of information stored within a given operator instance. The unique identifiers for each record are generated in a consistent, predictable and repeatable manner by the Source Record Identifier Generator 600 and are the same across restarts, so that the same record will get the same unique identifier value each time if it is processed more than once. The repeated evaluation of rule conditions for a particular record by the REO 800 will also yield the same set of action identifiers, because neither the record contents, nor the update rules change. As a result, the re-processed record will arrive at an instance of the update operator 510 with the same unique identifier and the same action identifiers. The update operator 510 will use those identifiers to generate the update identifiers, and then combine them with the record's data to form a set of records, which are sent to the server. Whenever the same record is sent to the server multiple times, it carries the same update identifier value. The server-side components can therefore identify and eliminate duplicate submissions of the same updates. In one implementation, the elimination is carried out by the server-side components.

When the Parallel Execution Infrastructure signals the end of data, the update operator 510 uses the communication protocol to signal the end of the data transmission. In one implementation, the update operator 510 waits until the server side completes processing, and then terminates its processing.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

What is claimed is:

1. A method for updating a database system using a parallel application, the parallel application including a plurality of parallel operators, the method comprising:
   receiving records;
   attaching a unique identifier to each record;
   receiving one or more user defined rules;
   generating an action and a user defined rule condition for each of the user defined rules;
   assigning an action identifier to each action/user defined rule condition pair;
   evaluating a first user defined rule condition for each record;
   attaching first action identifier to a first subset of the records, based on the evaluation of the first user defined rule condition;
   evaluating a second user defined rule condition for each record;
   attaching a second action identifier to a second subset of the records, based on the evaluation of the second user defined rule condition;
   transmitting the records to the database system with the unique identifiers and, for each of the first subset of the records, the first action identifiers;
   transmitting the second action identifier to the database system with each of the second subset of the records; and
   transmitting the one or more actions to the database system.

2. The method of claim 1 where the records are received from one or more sources and attaching a unique identifier to each record comprises:
   assigning a unique source number to each source of records; and
   for each source, combining the unique source number with a sequential number for records from that source.

3. The method of claim 1 where transmitting the records comprises:
   transmitting, for each record, a unique update identifier based on the record, its unique identifier, and its action identifiers.

4. The method of claim 1 further comprising:
   deriving columns for the received records and wherein transmitting the records to the database system comprises transmitting the derived columns.

5. The method of claim 1 where the first user defined rule condition is satisfied for each of the records.

6. The method of claim 1 where the unique identifiers are attached to the records in at least two parallel processes.

7. The method of claim 1 where the first and the second user defined rule conditions are evaluated for each record in at least two parallel processes.

8. The method of claim 1 where the records are transmitted to the database system in at least two parallel processes.

9. The method of claim 1 further comprising applying an action corresponding to the first action identifier to the first subset of records.

10. The method of claim 1 where the first action identifier corresponds to an UPDATE statement.

11. A computer program, stored on a tangible storage medium, for use in updating a database system using a parallel application, the parallel application including a plurality of parallel operators, the computer program comprising executable instructions that cause a computer to:
    receive records;
    attach a unique identifier to each record;
    receive one or more user defined rules;
    generate an action and a user defined rule condition for each of the user defined rules;
    assign an action identifier to each action/user defined rule condition pair;
    evaluate a first user defined rule condition for each record;
    attach first action identifier to a first subset of the records, based on the evaluation of the first user defined rule condition;
    evaluate a second user defined rule condition for each record;
    attach a second action identifier to a second subset of the records, based on the evaluation of the second user defined rule condition;
    transmit the records to the database system with the unique identifiers and, for each of the first subset of the records, the first action identifiers;
    transmit the second action identifier to the database system with each of the second subset of records; and
    transmit the one or more actions to the database system.

12. The computer program of claim 11 where records are received from one or more sources and the computer attaches a unique identifier to each record by:
    assigning a unique source number to each source of records; and
    for each source, combining the unique source number with a sequential number for records from that source.

13. The computer program of claim 11 where the computer transmits records by transmitting, for each record, a unique update identifier based on the record, its unique identifier, and its action identifiers.

14. The computer program of claim 11 further comprising executable instructions that cause the computer to:
    derive columns for the received records and wherein the computer transmits records to the database system by transmitting the derived columns.

15. The computer program of claim 11 where the first user defined rule condition is satisfied for each of the records.

16. The computer program of claim 11 where the unique identifiers are attached to the records in at least two parallel processes.

17. The computer program of claim 11 where the first and the second user defined rule conditions are evaluated for each record in at least two parallel processes.

18. The computer program of claim 11 where the records are transmitted to the database system in at least two parallel processes.

19. The computer program of claim 11 further comprising executable instructions that cause the computer to apply an action corresponding to the first action identifier to the first subset of records.

20. The computer program of claim 11 where the first action identifier corresponds to an UPDATE statement.

21. A computer system for use in updating a database system using a parallel application, the parallel application including a plurality of parallel operators, the computer system comprising:
    a rule compiler adapted to receive one or more user defined rules, generate an action and a user defined rule condition for each of the user defined rules, and assign an action identifier to each action/user defined rule condition pair;
    one or more nodes;
    a plurality of CPUs, each of the one or more nodes providing access to one or more CPUs;
    a plurality of operators, each of the one or more CPUs providing access to one or more operators;
    one of the operators comprising a source record identifier generator adapted to receive records and attach a unique identifier to each record;
    one of the operators comprising a rule evaluator operator adapted to receive records, including attached unique identifiers, from the source record identifier generator, evaluate a first and a second user defined rule condition for each record, and attach a first action identifier to a first subset of the records based on the evaluation of the first user defined rule condition and attach a second action identifier to a second subset of the records based on the evaluation of the second user defined rule condition;
    one of the operators comprising an update operator adapted to receive records, including attached unique identifiers and attached action identifiers, from the rule evaluator operator; and
    a database system server adapted to receive records, including attached unique identifiers and attached action identifiers, actions, and an update identifier from the update operator.

22. The computer system of claim 21 where one of the operators comprises a derived column projector operator coupled to provide derived column values to the rule evaluator and the update operator.

* * * * *